No. 12,661. REISSUED JUNE 18, 1907.
W. LINTERN.
MEANS FOR OPERATING PNEUMATIC VALVES.
APPLICATION FILED MAY 1, 1905.
2 SHEETS—SHEET 1.
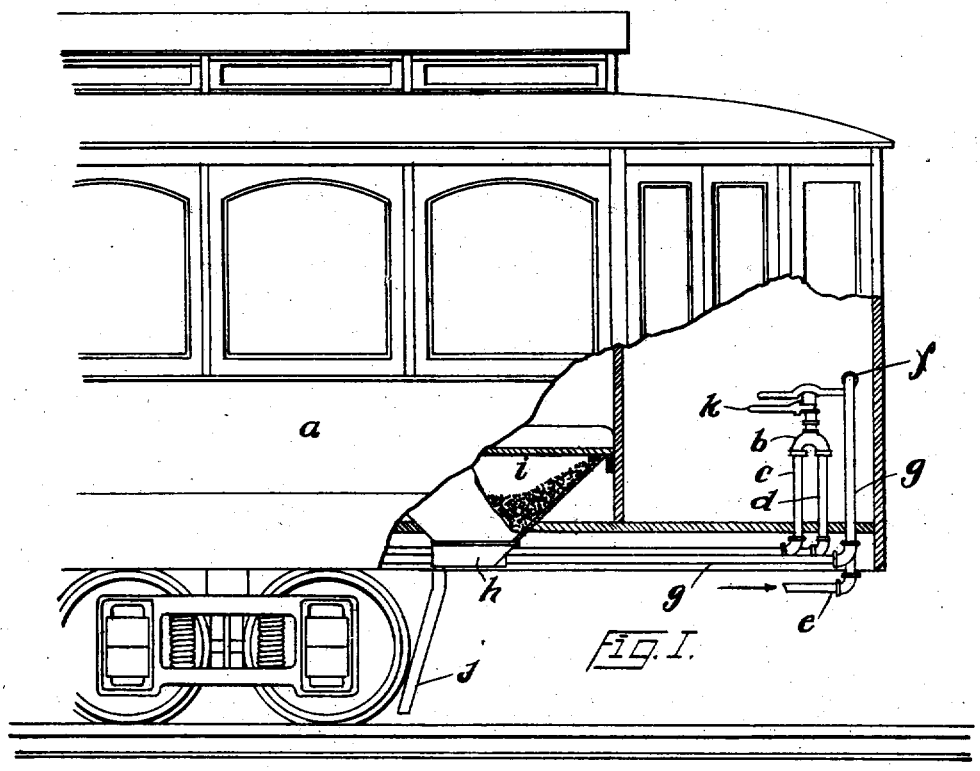
Fig. I.
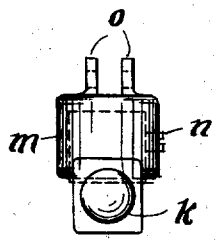
Fig. VI.
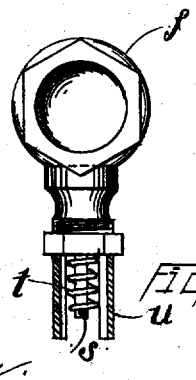
Fig. V.
Witnesses,
John J. Sullivan,
W. H. McConney.
Inventor,
William Lintern,
by Luther G. Hopper,
Attorney.
THE NORRIS PETERS CO., WASHINGTON, D. C.

No. 12,661. REISSUED JUNE 18, 1907.
W. LINTERN.
MEANS FOR OPERATING PNEUMATIC VALVES.
APPLICATION FILED MAY 1, 1905.
2 SHEETS—SHEET 2.
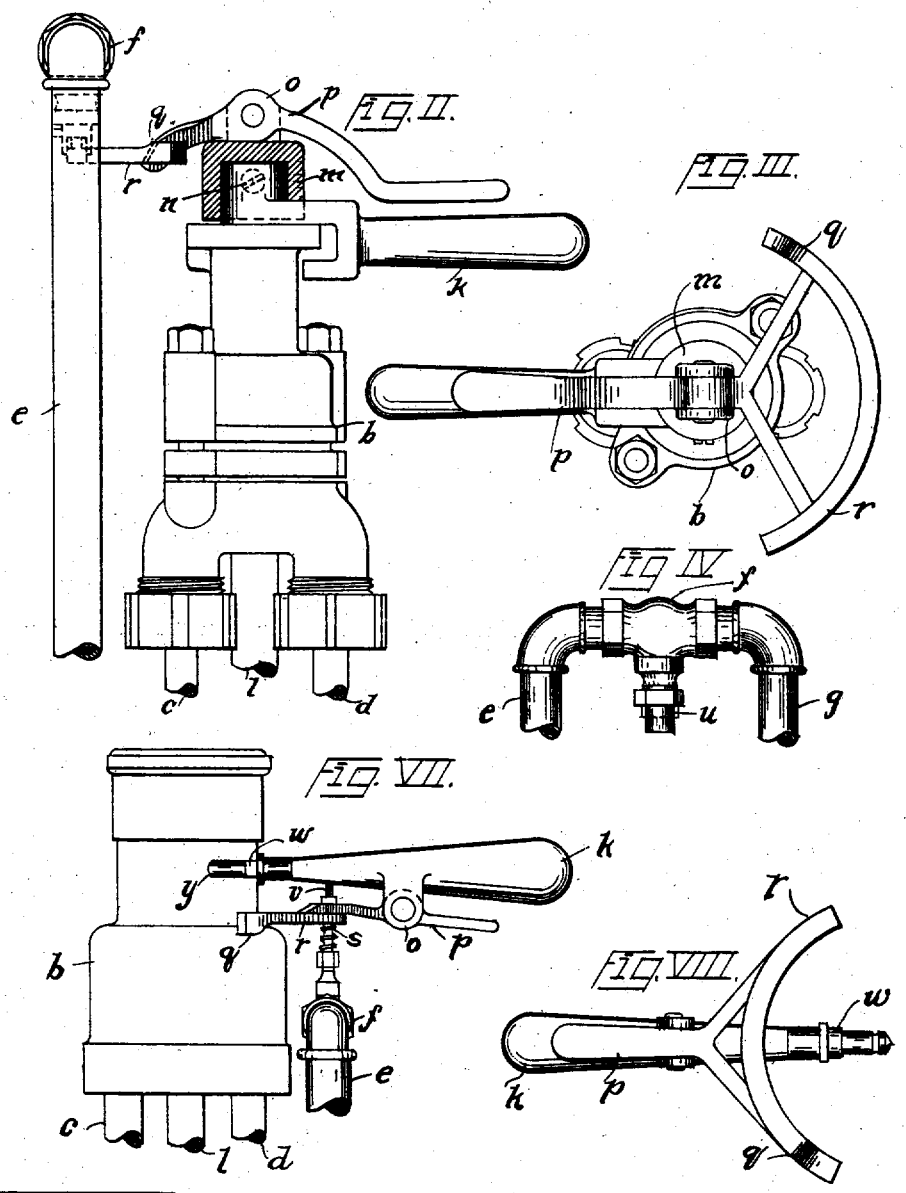
Witnesses,
John J. Sullivan
W. H. Mc Comey.
Inventor,
William Lintern,
by Luther S. Hopper,
Attorney.
THE NORRIS PETERS CO., WASHINGTON, D. C.

UNITED STATES PATENT OFFICE.

WILLIAM LINTERN, OF WEST PARK, OHIO, ASSIGNOR TO THE NICHOLS-LINTERN COMPANY, A CORPORATION OF CLEVELAND, OHIO.

MEANS FOR OPERATING PNEUMATIC VALVES.

No. 12,661. Specification of Reissued Letters Patent. Reissued June 18, 1907.

Original No. 765,743, dated July 26, 1904. Application for reissue filed May 1, 1905. Serial No. 258,436.

*To all whom it may concern:*

Be it known that I, WILLIAM LINTERN, a citizen of the United States, residing at West Park, in the county of Cuyahoga and State of Ohio, have invented certain new and useful Improvements in Means for Operating Pneumatic Valves, of which the following is a specification.

This invention relates to apparatus for operating an air valve in connection with controlling mechanism. Its object is to provide means whereby said air valve and the controlling mechanism may be conveniently manipulated as required by one hand of the operator. It is particularly adapted to motor cars and locomotives having an air-brake equipment, and wherein it is desired to install another pneumatic or steam system, such, for example, as a pneumatic or steam track sander. The operator, having one hand engaged with an electric controller or a throttle valve, may, by means of the present invention, manipulate both the air-brakes and the track-sanding, or other pneumatic or steam system, instantaneously and conveniently with his other hand.

To these ends my invention consists in the novel features, arrangements and combinations hereinafter described and claimed, an embodiment thereof, as applied to a motor car equipment of air-brakes and pneumatic track-sanders, being illustrated in the accompanying drawings, in which—

Figure I is a side elevation of the forward end of a motor car partly in section, showing the operating valves and a track-sander. Fig. II is a side elevation partly in section, and Fig. III is a plan view of an air-brake valve, and a supplementary air-valve and their operating means. Fig. IV is a front elevation of the valve *f* and its connections. Fig. V is an end view partly in section of the valve *f*. Fig. VI is a front view of the handle *k* and cap *m* detached. Fig. VII is a side elevation of another form of air-brake valve, showing the supplementary air-valve and the operating means as applied thereto. Fig. VIII is a bottom view of the handle shown in Fig. VII, and its attachments.

The reference letter *a* indicates a motor car, upon the front end of which is mounted in a convenient position a valve *b* communicating with air pressure pipes *c* and *d*, one of which pipes leads to the brake operating mechanism, and the other is connected to the compressed air supply, in the usual and well known way as applied to air-brake systems. A supplementary compressed air supply pipe *e* is located preferably in front of the air-brake pipes, and, being provided with a valve *f*, communicates therethrough with a pipe *g*, which latter leads to a suitable sand trap *h* communicating with a sand reservoir *i*, and provided with a delivery pipe *j*. Or, the pipe *g* may be connected to a whistle or other device for which the supplementary pneumatic system is adapted, instead of a track sander, if desired. The valve *b*, as plainly shown in Figs. II and III, is of one of the usual types, and is provided with a removable handle *k* adapted to be swung, horizontally through a considerable angle from its central, or closed, position; being swung in one direction to apply the brakes, and in the opposite direction to release them, the air in the latter case escaping through an exhaust pipe *l*.

Upon the hub of the handle *k* I fit a cap *m*, having a notch in its lower edge fitting over the shank of the handle, as shown in Fig. VI, and provided with a set screw *n* to keep it in place. Or, the cap *m* can be screwed or otherwise secured to the valve stem in cases where the valve stem projects above the handle *k*. Suitable lugs *o* are provided on the top of the cap *m* between which is hinged a lever *p*, having a handle end projecting substantially parallel with the handle *k*, so that it may be grasped by the hand of the operator when manipulating said handle *k*. The front end of the lever *p* is provided with a horizontally disposed rim *r*, being in the form of a circular arc centered at the hub axis of the handle *k*, flat topped and raised above its supporting arms, as plainly shown in Figs. II and III. One end of the rim *r* israised above the level of its upper face and connected therewith by an inclined surface, as shown at *q*, the purpose of which will be hereinafter explained.

The air pipes *e* and *g*, rising to a convenient position adjacent to the valve *b*, are connected by a horizontal section, as shown in Figs. II and IV, in which the valve *f* is located. This valve is self-closing, and, preferably, of the type known as a "whistle valve," having a projecting valve stem *s* provided with a spring *t* in compression, serving to hold the valve against its seat. I do not confine myself to this particular style of valve, since other self-closing valves having projecting stems may be employed for this purpose. The valve *f* is placed above the forward end of the lever *p*, so that the rim *r* of said lever runs under the end of the stem *s* when the handle *k* is swung. When it is desired to open the valve *f* the operator grasps the rear end of the lever *p*, without removing his hand from the handle *k*, thus raising the rim *r* against the stem *s*, and unseating the valve. The lever *p* is designed to rest normally against the top of the cap *m*, as shown in Fig. II. For the purpose of protecting the stem *s* and its spring, I prefer to provide a sleeve *u* which may be integral with the cap of the stuffing box, and notched at its lower end to receive the rim *r*, as plainly shown in Fig. V. In cases of emergency when it is desired to stop a car or train in the shortest possible time, the handle *k* of the air-brake valve is swung to the extreme limit of its travel in one direction, and, it being very advantageous to sand the track instantaneously in such case, I form the incline and elevated surface *q* at the end of the rim *r*, which is brought under the valve stem *s* by such movement of the handle *k*, which, as will readily be seen, serves to open the valve *f* automatically, or, in other words, without the necessity of operating the lever *p*.

Figs. VII and VIII illustrate another form of air-brake valve *b*, and the application of my invention thereto. In this arrangement the valve *f* is inverted and placed in the rear of the valve *b*. The hinge lugs *o* are formed upon the lower side of the handle *k*, and the lever *p* hinged thereto underneath said handle. This arrangement operates in the same way as that described above, except that the direction of the movement of the lever *p* is reversed. A stop *v* is provided for the lever *p*, and the handle *k* is provided with a square or rectangular portion *w* to fit the slot *y* in the valve *b*, and thereby keep said handle from rotating. It is obviously possible to hinge the lever *p* to the stem of the valve *b*; or, by changing the shape of the lever *p* so that it can be conveniently reached by the fingers or thumb of the operator's hand while grasping the handle *k*, the said lever *p* may be hinged to an extraneous support, since in the latter case it need not travel with the handle *k*. Other changes in the details of the construction may be made without departing from the essential principle of operating a supplementary valve *f* without removing the hand from the handle *k*.

Having now so fully described my invention that those skilled in the art to which it appertains can make and use it, either in the form shown herein or under some modification thereof, what I claim as new and desire to secure by Letters Patent is—

1. The combination with a controlling handle arranged to be swung horizontally through an arc of a circle, of a self-closing valve, and a hand-lever located in operative proximity to said handle adapted to operate said valve in any position of said handle, substantially as set forth.

2. The combination with a controlling handle arranged to be swung horizontally through an arc of a circle, of a self-closing valve, and a grip-lever upon said handle adapted to operate said valve in any position of said handle, substantially as set forth.

3. The combination with an air-brake valve and a track sanding device, of a controller handle for operating the said air-brake valve arranged to swing through an arc of a circle, a self-closing valve, and a hinged hand-lever located in close proximity to said controller handle and arranged to be in close and constant operating relation with both the said self-closing valve and the controller handle, substantially as set forth.

4. The combination with an air-brake valve and a track sanding device, of a controller handle for said air-brake valve arranged to swing through an arc of a circle, a self-closing valve, a hinged lever located in close proximity to said controller handle and arranged to be in close and constant operating relation with both the self-closing valve and the controller handle, and means for automatically operating the said self-closing valve at a predetermined position of the said controller handle, substantially as set forth.

5. The combination with a controlling handle arranged to be swung through an arc of a circle, of a self-closing valve, and a lever located in close proximity to said handle provided with a circular segment adapted to operate said valve in any position of said handle, substantially as set forth.

6. The combination with a controlling handle arranged to be swung through an arc of a circle, of a self-closing valve, and a grip lever upon said handle provided with a circular segment adapted to operate said valve in any position of said handle, substantially as set forth.

7. The combination with a controlling handle arranged to be swung through an arc of a circle, of a self-closing valve, and a grip lever hinged to said handle provided with a circular segment through which said valve may be operated at any position of said handle, substantially as set forth.

8. The combination of a controlling handle arranged to be swung through an arc of a circle, a self-closing valve, a lever located in close proximity to said handle, a circular segment carried by said lever, and an elevated surface upon said segment adapted to open said valve automatically when said controlling handle is swung to an emergency position, substantially as set forth.

9. The combination of a controlling handle arranged to be swung through an arc of a circle, a self-closing valve, a grip lever upon said handle, a circular segment carried by said grip lever, and an elevated surface upon said segment connected to the face thereof by an inclined plane and adapted to open said valve automatically when said controlling handle is swung to an emergency position, substantially as set forth.

10. In apparatus of the class described, the combination of a controlling handle mounted to be swung through an arc of a circle, a hinged lever extended in close proximity to said handle and provided with a circular segment, and a self-closing valve provided with a projecting stem arranged to be operated by the segment of said hinged lever, substantially as set forth.

11. In apparatus of the class described, the combination of a controlling handle mounted to be swung through an arc of a circle, a grip lever having a hinge attachment to said handle and provided with a circular segment, and a self-closing valve provided with a projecting stem arranged to be operated by the segment of said grip lever, substantially as set forth.

12. In apparatus of the class described, the combination of a controlling handle mounted to be swung through an arc of a circle, a grip lever having a hinge attachment to said handle, a suitable top for said grip lever, a circular segment carried by said grip lever, and a self-closing valve provided with a projecting stem arranged to be operated by the segment of said grip lever, substantially as set forth.

13. In apparatus of the class described, the combination of a controlling handle mounted to be swung through an arc of a circle, a grip lever having a hinge attachment to said handle, a suitable stop for said grip lever, a circular segment carried by said grip lever, an elevated and inclined surface upon said segment, and a self-closing valve provided with a projecting stem arranged to be operated by the segment of said grip lever and opened automatically by said elevated and inclined surface when said controlling handle is swung to an emergency position, substantially as set forth.

14. The combination with an air-brake controlling valve, of a handle thereof having a limited travel about the operating axis of said valve, a grip lever hinged so as to travel with said handle, a circular rim carried by said grip lever, and a supplementary self-closing valve provided with a projecting stem arranged to be operated by the rim of said grip lever, substantially as set forth.

15. The combination with an air-brake controlling valve, of a handle thereof having a limited travel about the operating axis of said valve, a grip lever hinged so as to travel with said handle, a circular rim carried by said grip lever, a supplementary self-closing valve provided with a projecting stem arranged to be operated by the rim of said grip lever, and a raised portion of said rim adapted to automatically open said supplementary valve when said brake valve handle is swung to its outer position in one direction, substantially as set forth.

In testimony whereof I affix my signature in the presence of two subscribing witnesses at Cleveland, Ohio, this 22nd of April, 1905.

WILLIAM LINTERN.

Witnesses:
JNO. T. SULLIVAN,
ELSIE M. HOPPER.